June 21, 1938.　　　　O. E. TEALL　　　　2,121,454
MACHINE FOR MAKING SANITARY PADS
Filed Nov. 13, 1933　　　6 Sheets-Sheet 1
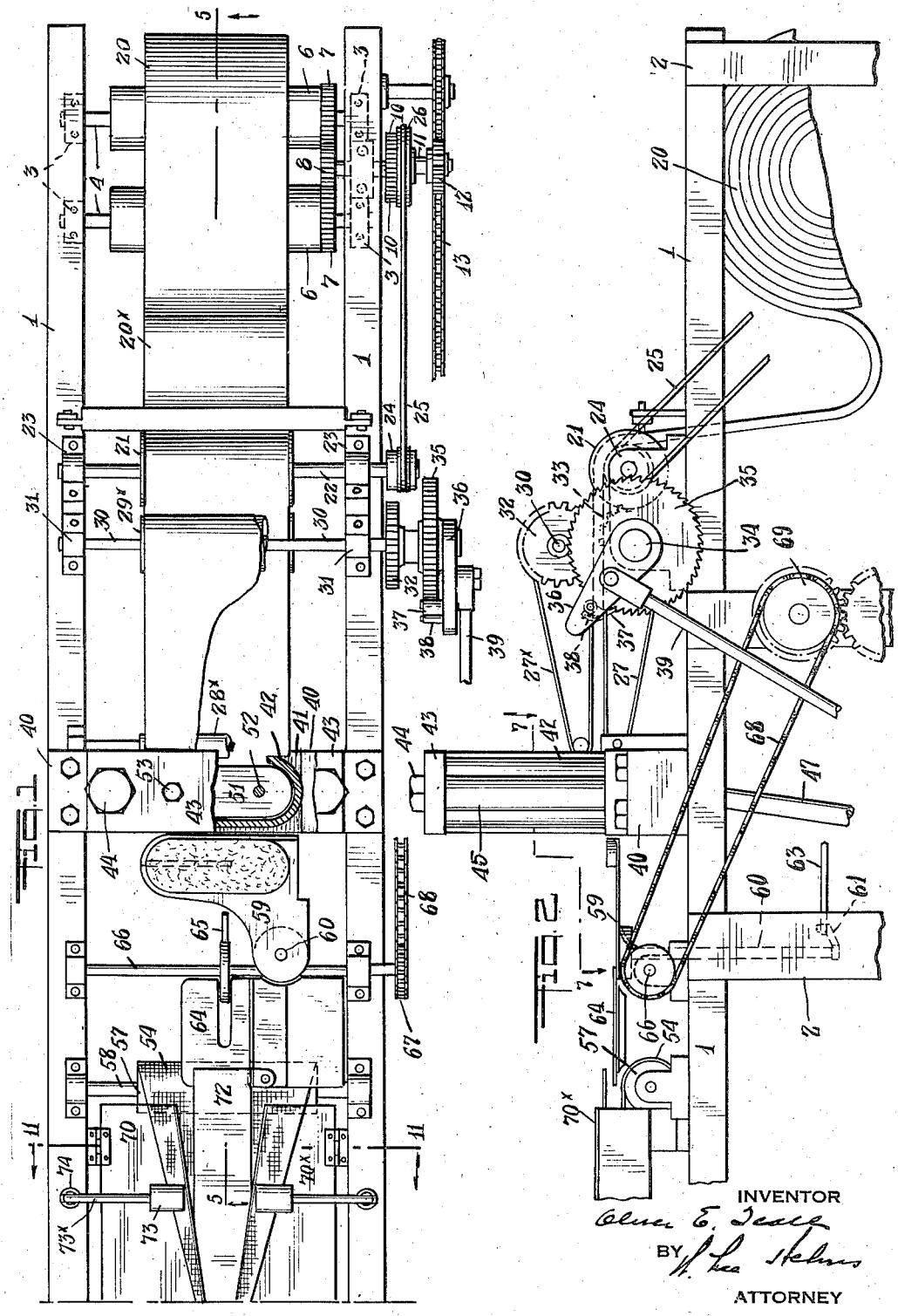
INVENTOR
Oliver E. Teall
BY
ATTORNEY

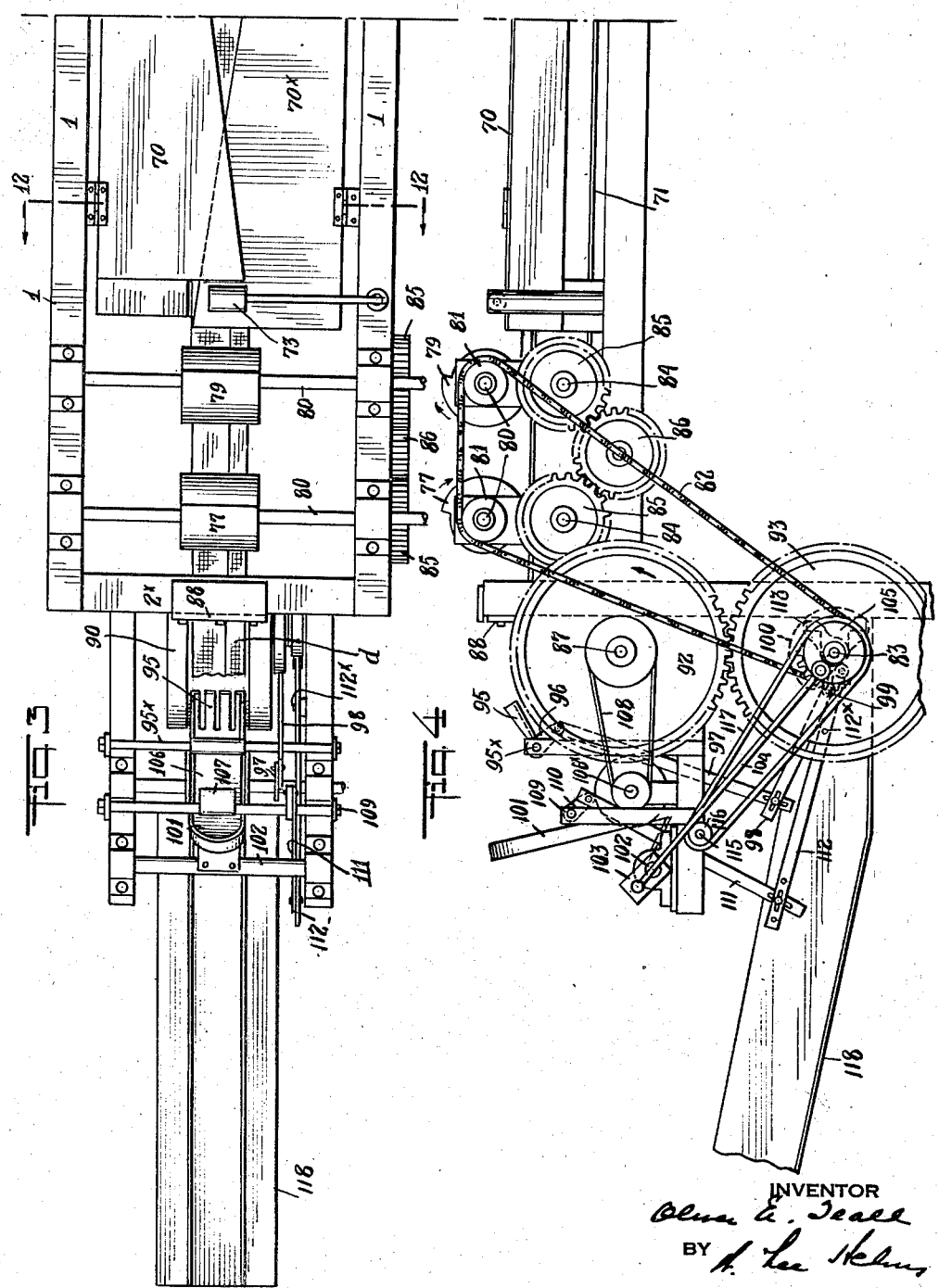

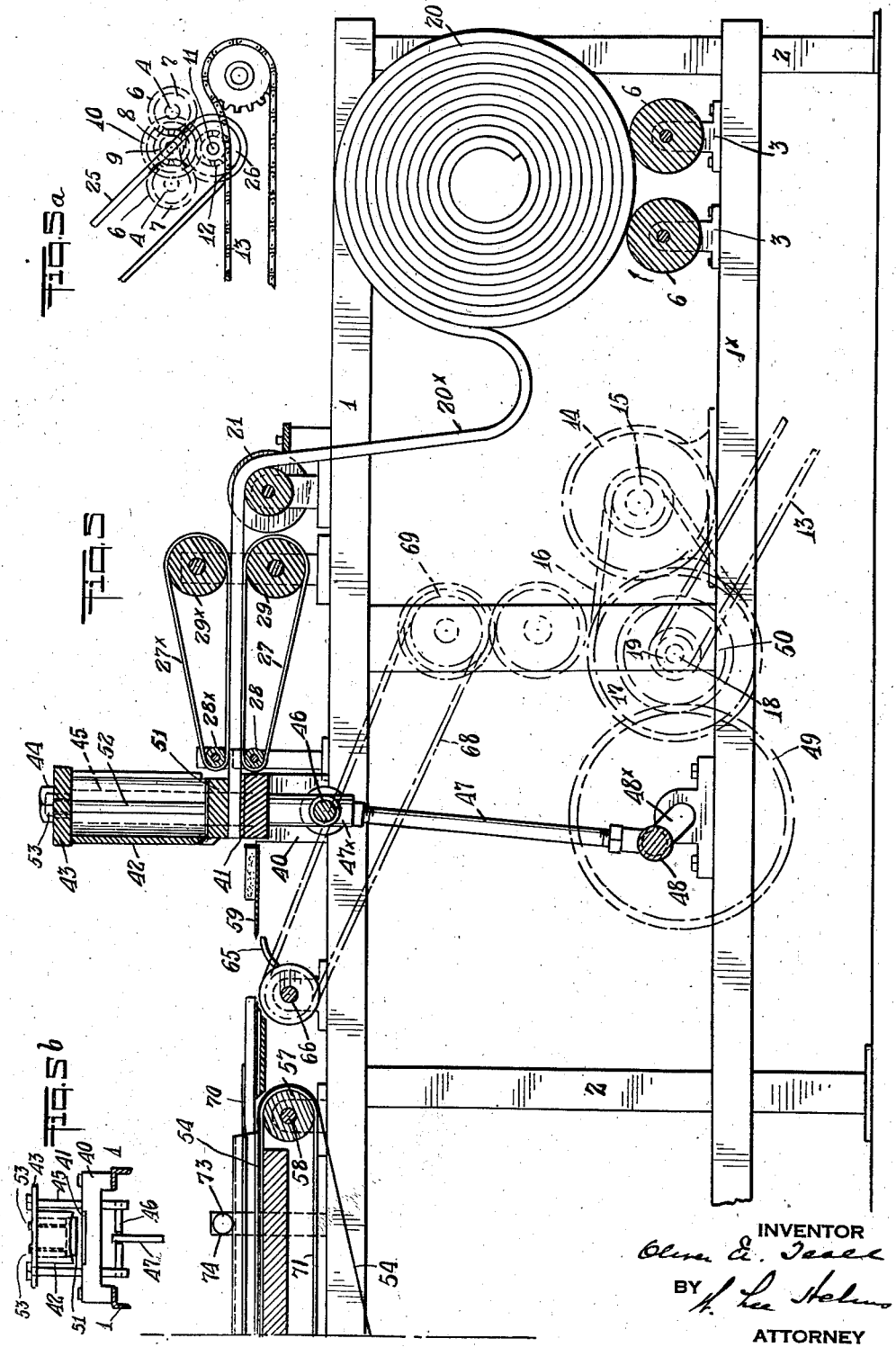

June 21, 1938. O. E. TEALL 2,121,454
MACHINE FOR MAKING SANITARY PADS
Filed Nov. 13, 1933 6 Sheets-Sheet 4
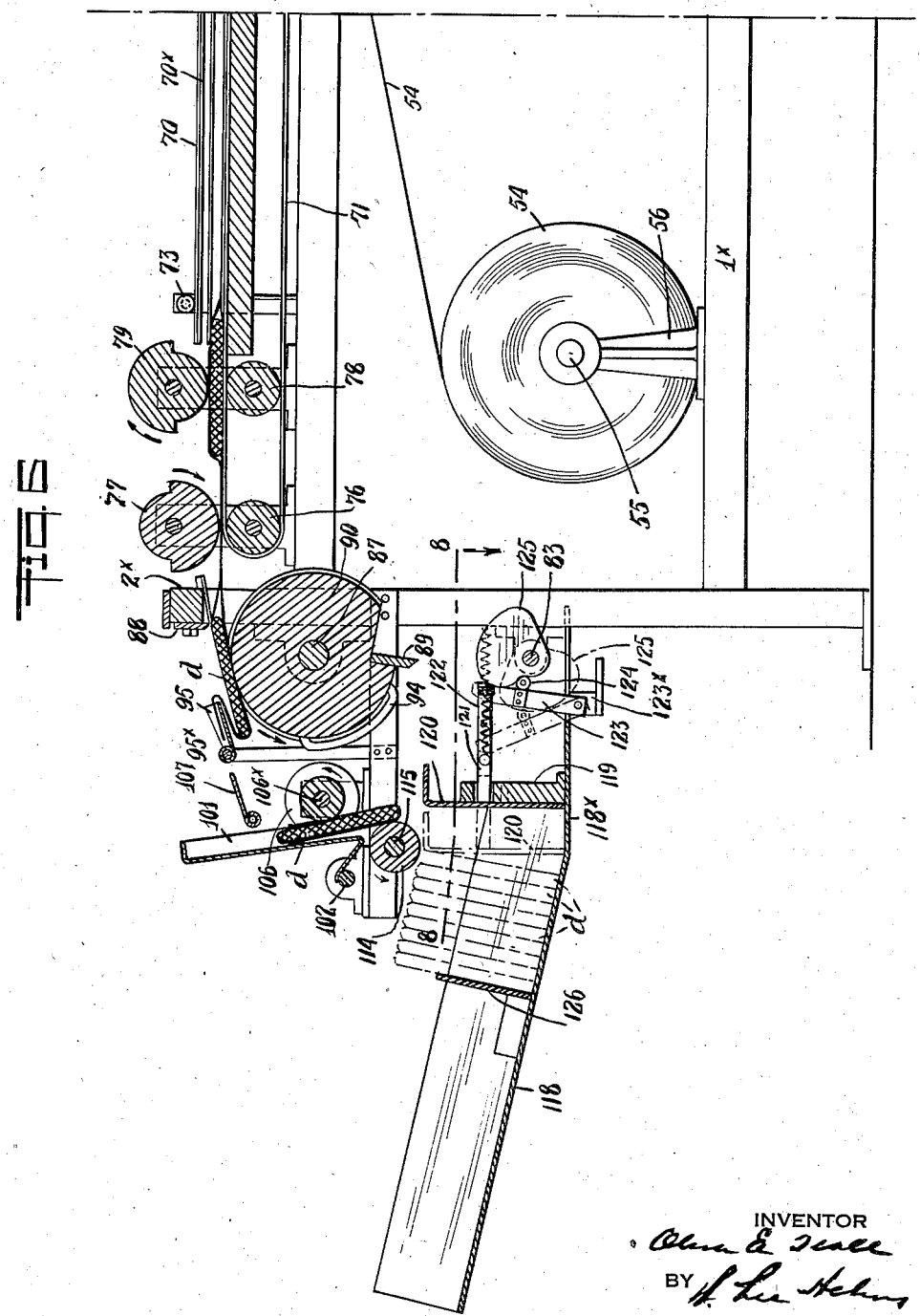

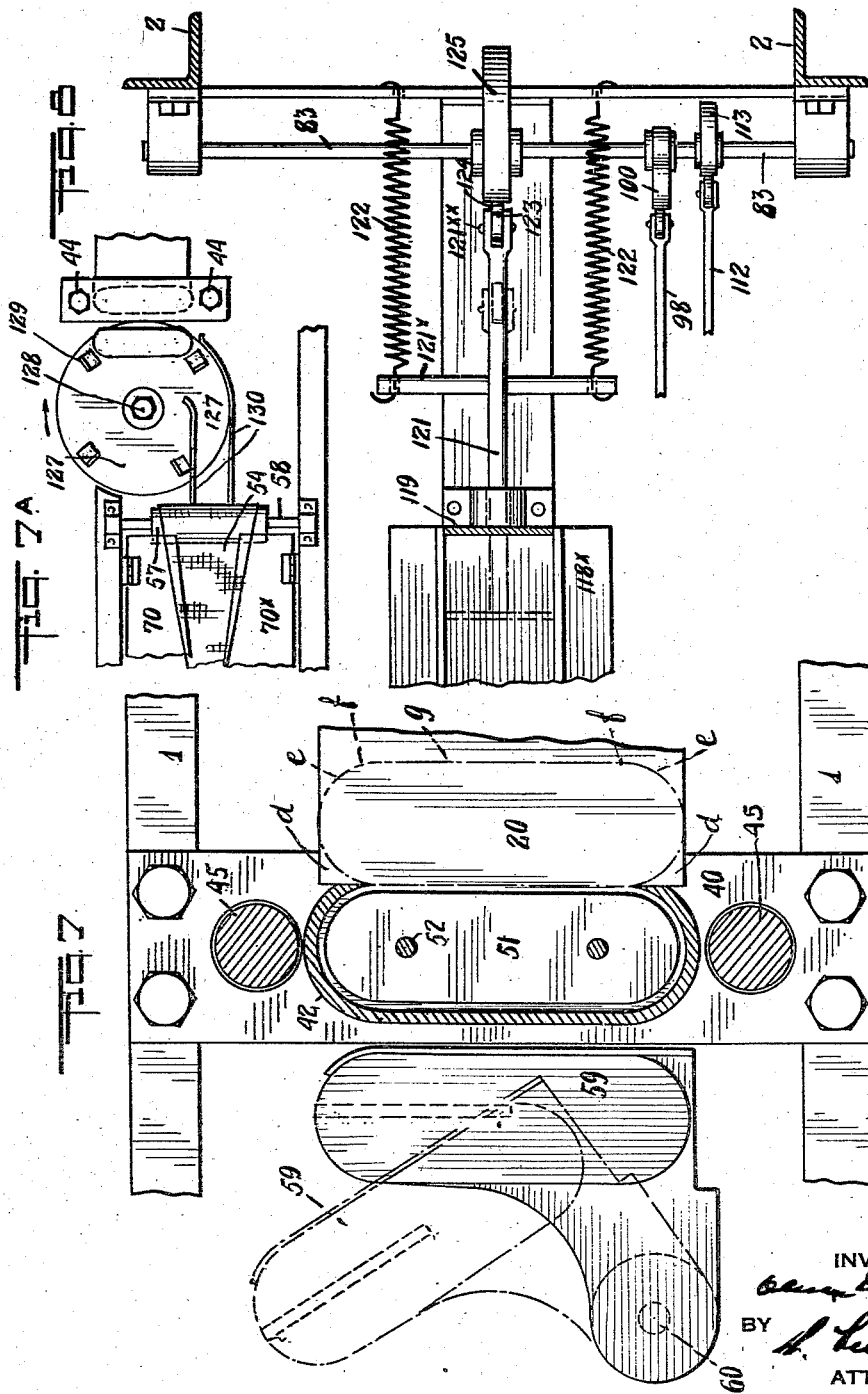

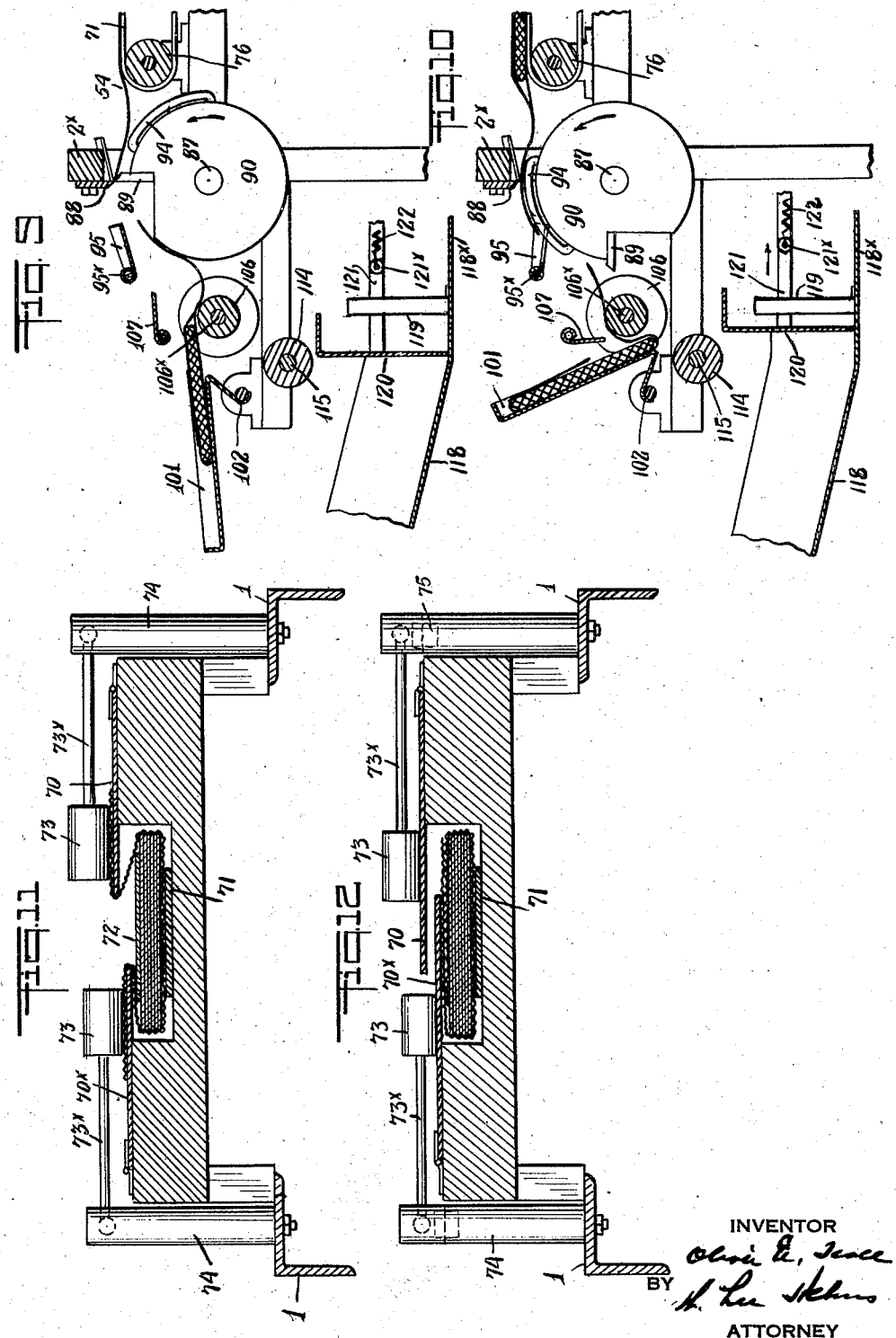

Patented June 21, 1938

2,121,454

UNITED STATES PATENT OFFICE 2,121,454

MACHINE FOR MAKING SANITARY PADS

Oliver E. Teall, Utica, N. Y., assignor to The Sterilek Company, Brooklyn, N. Y., a corporation of New York Application November 13, 1933, Serial No. 697,758

15 Claims. (Cl. 154—29)

The object of the present invention is to provide a machine for manufacturing sanitary pads of that type in which an absorbent filler piece is enclosed within a gauze wrapper, and the specific object of the invention is to provide a machine having co-acting elements which will more efficiently handle the filler and gauze in the several processing steps, and which will comprise means for completely forming the pad, the final steps being the folding over of the ends of the gauze, and which will stack completed pads for ready insertion thereof in the usual retail packages.

Further objects of the invention will hereinafter appear.

The invention will be described with reference to the accompanying drawings, in which Fig. 1 is a plan view of an embodiment of the invention, certain elements including the rear or delivery end of the machine, being partly broken away.

Fig. 2 is a side elevation of the apparatus illustrated in Fig. 1, the lower part thereof being broken away.

Fig. 3 is a plan view of the delivery end of the apparatus.

Fig. 4 is a side elevation of the structure illustrated in Fig. 3.

Fig. 5 is a longitudinal sectional elevation on the line 5—5, Fig. 1.

Fig. 5A is a schematic fragmentary view illustrating certain driving elements for the roll of filler.

Fig. 5B is a schematic view in front elevation of the cutter and certain carrying and operating means therefor.

Fig. 6 is a longitudinal sectional elevation of the machine at the delivery end thereof, this figure being supplementary to Figure 5.

Fig. 7 is a horizontal section on the line 7—7, Fig. 2.

Fig. 7A is a plan view, largely diagrammatic, showing modified means for delivering the filler pieces to the wrapping gauze.

Fig. 8 is a horizontal section on the line 8—8, Fig. 6, looking in the direction of the arrows.

Fig. 9 is a diagrammatic sectional elevation showing the position of the cutting and gauze-end folding devices immediately following a cutting operation.

Fig. 10 is a similar view to Fig. 9, showing the position of the elements of the latter in a continued movement thereof and preparatory to discharge of the wrapped pad.

Fig. 11 is a vertical section on the line 11—11, Fig. 1, looking in the direction of the arrows.

Fig. 12 is a vertical section on the line 12—12, Fig. 3, looking in the direction of the arrows.

The machine comprises a plurality of associated and co-acting devices which may be conveniently described in succession as follows:—

(a) The continuous filler roll feed; (b) the intermittent filler strip feed; (c) the filler cutting mechanism; (d) the mechanism for depositing the filler pieces upon the gauze; (e) the gauze feeding and folding mechanism; (f) the gauze wrapped filler feed; (g) the final cutting mechanism, and, (h) the end-folding mechanism.

The above recited mechanisms act in cooperation, first, to rotate the filler roll slowly and continuously to form a loop intermediate the filler roll and the means for intermittently advancing the filler to the filler cutting mechanism.

The filler cutter mechanism comprises a reciprocating die member adapted to sever from the end of the filler strip successive rounded end filler pieces.

The mechanism for depositing the filler pieces upon the gauze comprises a member mounted on a vertical axis and adapted to carry the filler pieces from the position transverse of the gauze to a position longitudinally and centrally thereof.

The gauze feeding and folding mechanism carries the gauze with the filler pieces thereon and folds the margins of the gauze over upon the filler piece so that the same is encased, whereupon the gauze wrapped filler feed advances the thus semi-formed product to the final cutting mechanism which severs an end of the folded gauze rearwardly of the encased filler piece and the thus severed and partially completed unit is acted upon by the gauze end-folding mechanism to fold the two ends of the gauze over upon the filler piece, the completed product then being stacked.

*The continuous filler roll feed*

The apparatus comprises upper and lower horizontal frame members 1 and 1x and a suitable number of vertical frame members 2 tied together by any desired forms or cross-pieces, the cross-pieces, for the sake of clearness, not being shown. Upon the opposed lower longitudinal frame members 1x are secured suitable bracket supports 3 for the shafts 4 of a pair of rollers 6. These rollers are rotated in the same clockwise direction, and to that end, carry spaced gears 7 driven by an intermediate gear 8 on a shaft, Fig. 1.

On shaft is a gear 10 in mesh with an underlying drive gear on a shaft 11, which shaft carries a sprocket wheel 12 engaged by a chain 13 continuously driven, as by a motor shown diagrammatically at 14, the motor rotating a sprocket wheel 15 connected by chain 16 to a large sprocket wheel 17 on a shaft 18, the shaft carrying a small sprocket wheel 19 receiving the said drive chain 13. Shaft 18 is, in the present embodiment, the main drive shaft from which power is led to the various members which are driven.

Rollers 6 are adapted to support a roll of filler strip 20 and inasmuch as the rollers 6 move in clockwise direction and continuously, they serve to maintain a loop of the filler strip at 20x.

The intermittent filler strip feed

The filler strip is received from the loop 20x by a supporting flanged drum 21 having a shaft 22 supported by bracket members 23, shaft 22 carrying a pulley 24 connected by belt 25 with a pulley 26 on shaft 11. The filler strip then passes between two feeding belts, the lower feeding belt 27 passing over a rear supporting roller 28 and over a front supporting and driving roller 29. The upper feeding belt 27x passes over a rear supporting roller 28x and a front supporting and driving roller 29x. Roller 29x is on a shaft 30 supported by opposed brackets 31 and carries a gear 32 in mesh with a gear 33, indicated in dotted lines, Fig. 2, on a shaft 34. Fixed to shaft 34 is a ratchet wheel 35 and loosely mounted on the shaft is a pawl lever 36 carrying a pawl 37, normally pressed inwardly by a spring 38, engaging the teeth of the ratchet wheel. Pawl lever 36 has pivotally connected thereto an operating rod 39 which is reciprocated from a suitable driving element of the machine (not shown). By such reciprocation, step by step movements are imparted to belts 27, 27x and the length of the movement is equivalent to the width of the filler piece to be cut from the end of the filler strip.

The filler cutting mechanism

Extending across frame members 1 is a relatively heavy cutter frame member 40 carrying on its upper surface a die 41 in register with a punch 42, the horizontal cross section of which is shown in Fig. 7. Punch 42 is carried by a cross head 43 secured by nuts 44 upon the upper threaded ends of two reciprocatory rods 45 which pass through guide apertures formed in cutter block 40, the rods toward their lower ends carrying a transverse shaft 46 encircled by the sleeve member 47x of a crank rod 47 connected at its lower end to the crank 48x of shaft 48, extending transversely of longitudinal frame members 1x and carrying a gear wheel indicated diagrammatically at 49, Fig. 5, in mesh with a gear wheel 50 on main drive shaft 18.

The punch 42 is hollow and disposed within it is a weighted pressure block 51 carried by two rods 52, the upper ends of the rods passing through member 43 and being threaded to receive nuts 53. Preliminary to a cutting operation, the block 51 bears upon the upper surface of the filler strip, as shown in Fig. 5, so as to hold the same in proper position relatively to the punch and die, the sliding connection of the holding rods relatively to member 43, permitting the block to remain in position during the downward movement of the punch, and when the cutting action is completed, rod 47 will move member 43 and the punch upwardly a slight distance beyond that shown in Fig. 5, the contact of nuts 53 with member 43 causing the pressure block 51 to be given a corresponding upward movement, thus releasing the filler strip, and the latter will be pushed forward the width of a successive filler piece, the parts then lying in the position of Fig. 5 with the exception that the punch and pressure block will be slightly raised.

The mechanism for depositing the filler pieces upon the gauze

The roll of gauze 54 is carried by a shaft 55 supported by brackets 56 carried by lower horizontal frame members 1x, and the gauze is led upwardly to a guide roller 57 on a shaft 58 suitably journalled in supporting members carried by the upper frame members 1. The gauze is then moved through the folding mechanism, as will be hereinafter explained.

The means for depositing the cut filler piece upon the gauze comprises a carrier movable upon a vertical axis and I have shown two suitable forms of carrier. In Figs. 1, 2, 5 and 7, the carrier is in the form of an oscillating plate, the plate being shown at 59 carried by a vertical shaft 60 having at its lower end a crank arm 61, Fig. 2, connected to an operating rod 62 which may be reciprocated by a suitable cam or crank (not shown) driven from main driving shaft 18. By such means an intermittent oscillatory movement is given to carrier 59. The cutting action of the punch and die is illustrated in Fig. 7. The first action is to round the ends of the filler piece, cutting off the corners d, Fig. 7, and forming a rounded cut indicated by the dotted lines e and terminating at f. When the filler strip is pushed forward for a succeeding cut, a straight face of the knife separates the filler piece by completing the line of cut g, the punch therefore being so shaped as to cut V-shaped pieces intermediate the ends of two successive filler pieces. At the instant of severing a filler piece from the end of the strip, it lies above carrier 59 and the cutting action causes it to drop on to the carrier, whereupon the carrier is swung in the direction indicated by the dotted line position of member 59, in Fig. 7, turning the filler piece at right angles.

When the carrier 59 is thus in proper position relatively to the moving gauze, it will lie under a plate 64 and in register with a wiper finger 65 on a shaft 66, the latter carrying at one end a sprocket wheel 67 engaged by a belt or chain 68 driven from a second sprocket wheel 69, Fig. 5, the latter being rotated by any suitable connections with the main drive shaft 18. The carrier is slotted to allow clearance for the finger 65 and the finger will engage and move the filler piece co-axially with the moving gauze 54 so that the latter will receive, grip and carry the filler piece toward and through the folding mechanism.

The gauze feeding and folding mechanism

As hereinbefore stated, the gauze passes from the roll about shaft 55 to a supporting roll 57 and thence passes into engagement with a plurality of folding elements of usual construction and comprising the wedge plates 70, 70x which are raised above roll 57, the margins of the gauze initially being guided upwardly and upon plates 70, 70x, in the manner illustrated in Fig. 11, the filler piece being guided between a lower guide belt 71 and an upper guide plate 72, the margins of the gauze being gradually brought toward the center of the filler piece until one margin is folded upon the other margin in the manner illustrated in Fig. 12. Weighted rollers 73 co-act with the wedge plate 70 in the folding action, each weight being carried by a rod 73x which may be adjustably supported by a post 74, as by boring out the post toward its upper end and threading it to receive an adjustable supporting stud 75, Fig. 12, rod 73x passing through a vertical slot formed in the bored out portion of the post. It will be understood that the rollers 73 are rotatably mounted on rod 73x. In this manner the angle of the roller 73 relatively to the plates 70, 70x, may be adjusted, the adjusting stud 75 engaging a ball-like end of the appropriate rod 73x. Any desired folding means for wrapping the gauze over upon the filler piece may be employed, that illustrated in the drawing being a simple form of known elements.

The gauze, with the superposed filler piece is drawn from the roll of gauze by the combined action of feed rollers and belt 71 so designed as to compensate for the increased thickness at the areas where the filler pieces lie wrapped by the gauze, such means being illustrated more particularly in Figs. 3, 4 and 6. It will be noted that when the gauze reaches roller 57, it does not contact immediately with the roller but with belt 71 which is led over the roller and which passes under the folding plates, as shown in Figs. 11 and 12. The belt continues to and is led over a roller 76 in register with a roller 77 cut away for approximately fifty percent of its periphery, the thickness of the cut away portion being greater than the thickness of the gauze wrapped filler piece. Belt 71 is also given support by a second roller 78 which lies in register with a roller 79 which, like roller 77, has its periphery cut away for approximately fifty percent, the formation being for the same purpose as that of roller 77.

Rollers 77 and 79 are carried by shafts 80 carrying sprocket wheels 81 over which is led chain 82 driven by a suitable pulley or sprocket wheel on shaft 83, Fig. 4.

Rollers 76, 78, are carried on shafts 84 carrying gear wheels 85 in mesh with a pinion 86 so that rollers 76, 78, will be driven in the same direction counter clockwise. Gear wheel 85 may be driven from a shaft 87 through any suitable gear connection (not shown).

The final cutting mechanism

When one gauze-wrapped filler piece has been carried well in advance of the final cutting mechanism, as will later be explained, the gauze between that piece and a succeeding piece is severed, Fig. 9, showing the position of the parts immediately following the action of the cutting mechanism.

The cutting mechanism comprises a fixed cutter blade 88 secured to transverse frame member 2x and a movable cutter blade 89 carried by a rotating peripherally channelled drum 90. Drum 90 is mounted on shaft 87, the shaft carrying gear 92 in mesh with a driven gear 93 on shaft 83. Back of the cutter blade 89 the drum carries a plurality of thin peripherally located blades 94, three in the present embodiment, which are adapted to receive the severed end of the gauze and carry it forwardly as cutter blade 89 leaves a co-acting cutter blade 88 succeeding the gauze-severing operation. Drum 90 is continuously rotated in synchronism with the feed rollers 77 and 79.

The gauze end-folding mechanism

The initial member of the gauze end-folding mechanism comprises a tray 95 which initially lies in the position of Fig. 9. The tray is fixed to a pivotal shaft 95x on which is secured a depending lever 96, Fig. 4, connected by a link 97 with a rock lever 98 fulcrumed on a suitable support at 99 and having its end lying in the path of a cam indicated in dotted lines at 100, Fig. 4, and carried by shaft 83.

By means of cam 100, tray 95 holds its position as shown in Fig. 9, until the knife passes below it and then is moved to the position of Fig. 10. In the meanwhile, blades 94 support and hold upward the cut end of the gauze, and the blades enter slots formed in the tray, as shown in Fig. 3. The blades and the tray then lie in the position of Fig. 10, the gauze thus being supported by the blades well within the tray. As drum 90 continues to move counter clockwise, the free end of the gauze is moved up toward the pivotal support of the tray, and rollers 77, 79, feed a succeeding gauze-wrapped filler piece to the channelled surface of drum 90, whereupon cam 100 moves the tray upwardly and the continued movement of drum 90 carries the initial gauze-wrapped filler to the position of Fig. 6.

When the gauze-wrapped filler, indicated at d, Fig. 6, reaches the position shown in that figure, a preceding gauze-wrapped unit is being discharged from the discharge tray 101 into the stacking mechanism. Discharge tray 101 is fixed to a shaft 102 carrying a crank arm 103 connected by crank rod 104 with a crank disk 105 on shaft 83. The throw of crank disk 105 is sufficient to oscillate shaft 102 but not to rotate it. Immediately following the discharge of a wrapped filler by discharge tray 101, crank disk 105 actuates shaft 102 and moves the discharge tray from the position of Fig. 6 to the position of Fig. 9, and wrapped filler d is carried from the position of Fig. 6 to the position of Fig. 9, whereupon the knife 89 severs the gauze as shown in the last-named figure, and that end of the severed gauze attached to the wrapped filler piece shown in Fig. 9 lies partly supported on cutter drum 90 and partly on a flanged feed roller 106, the feed roller acting to throw the filler piece back to the rear end of tray 101 with the gauze end lying intermediate the tray and the surface of roller 106. Crank disk 105 then tilts the tray upwardly to the position of Fig. 10 immediately preceding downward movement of a creasing blade 107. Roller 106 is continuously driven by means of a belt 108 driven from a pulley on shaft 87 and connected to a pulley on the roller shaft 106x, Fig. 4. The creasing blade 107 is carried on a shaft 109 carrying a lever 110 connected by link 111 with a rock lever 112 fulcrumed at 112x and in the rotation of shaft 83 a quick-throw cam 113 engages the end of rock lever 112 and imparts a quick throw of creasing blade 107 from its position shown in Fig. 9 to that of Fig. 10 which is immediately followed by the movement of discharge tray upwardly into discharging position as shown in Figs. 10 and 6.

The discharge of the wrapped filler unit is aided by the rotation of roller 106 and the rotation of an underlying roller 114 mounted on a shaft 115 carrying a pulley 116, Fig. 4, engaged by a belt 117 driven from the pulley 108 on shaft 83. The wrapped unit is thus discharged into the stacking device.

The stacking device

The stacking device comprises an upwardly inclined tray 118 having a lowermost horizontal section 118x which supports a fixed vertical wall 119 affording a stop for a pusher plate 120 and also a bearing for a shaft 121, shaft 121 carrying a crossbar 121x engaged by springs 122 which serve to hold the pusher plate normally in retracted position. Shaft 121 at its end is forked, the forked end being apertured to receive a pin 121xx which passes through a vertical slot formed in a lever 123 pivotally mounted on a fixed bracket 123x and carrying a roller 124 adapted to be engaged by a cam 125 on shaft 83. When the completed sanitary pad is about to be discharged into the stacking device, pusher plate 120 is held by springs 122 in the full line position of Fig. 8 and the cross sectional position of Fig. 6, and when the pad is received in the tray, the rotation of cam 125 will act upon lever 123 to move pusher plate 120 to the dotted line position of Fig. 6, where the pad will be held through any suitable frictional engagement on its side walls. The pads will be held in stacked position not only by the side walls of the tray, but by a weighted backing plate 126, as shown in Fig. 6. When the pusher plate has been moved to the dotted line position of Fig. 6, the continued movement of cam 125 will permit springs 122 to restore it to initial position, thus leaving clearance for the reception of a succeeding pad.

Modified form of mechanism for depositing the filler piece on the gauze

In Fig. 7A, I have shown a plan view, largely diagrammatic, of a modified means for depositing the successive filler pieces upon the moving gauze wrapper. The filler piece cutter and feeding mechanism for the filler strip is offset from the gauze feeding and wrapping mechanism, and adjacent the cutter punch and die devices is a rotary carrier disk 127 carried on a driven shaft indicated at 128 and connected to a suitable power element of the machine for continuous operation. The height of disk 127 will be approximately that of the rotating top surface of roller 57 over which the gauze 54 is led. Upon the disk 127 are equally spaced contact fingers 129 and as the disk is rotated, the filler piece cutting mechanism in severing successive filler pieces causes them to drop upon the disk intermediate two contact fingers. As the disk rotates in the direction of the arrows, the filler pieces are successively turned from the position at right angles to the longitudinal axis of the moving gauze to a position in line with said axis, and at that point the filler piece passes between two guiding strips 130 supported in a suitable manner above the disk, one strip being cut away to permit passage below it of the fingers 129. The rotating disk carries the filler piece successively into contact with the moving gauze, proper registration being obtained by the fingers 129, because that finger immediately back of the filler piece at the time the latter passes between the guiding strips overcomes the frictional effect of the strips in causing the piece to slip upon the disk, so that the end of the finger reaches the end of the filler piece and gives it a positive movement toward and upon the moving gauze, the latter, by reason of its coarse woven structure, gripping the filler piece and carrying it through the gauze folding elements.

General operation

The specific operation of each element of the device having been recited, I will now describe the general operation of the machine.

The filler strip wound in roll formation being placed upon the two clockwise moving rollers 6 is fed in loop formation and passes over flanged roller 21 and between the feed belts 27, 27x, these belts being given step-by-step movement through the pawl and ratchet device including ratchet wheel 35 and intermittently moved pawl 37.

The intermittent movements of the filler strip are in synchronism with the operations of the punch and die filler piece cutting device. That is to say, when the punch is up, weight 51 will also be elevated and will permit belts 27, 27x, to move the filler strip a distance equal to the width of a filler piece. This action is immediately followed by downward movement of the punch which causes weight 51 to press upon the filler strip immediately preceding the cutting action and the cut filler piece falls upon the pivoted carrier 59 or 127, as the case may be. The carrier moves to turn the ends of the strip in line with the longitudinal axis of the gauze when the latter picks up the strip and carries it through the gauze folding mechanism, which folds the margins of the gauze over upon the filler piece, one margin lying under the other in the usual manner. Movement of the gauze is continuous, such movement being obtained through the rotation of the rollers 76, 77, 78, 79 and belt 71, the end of the gauze preceding a filler piece being carried into tray 95 which is raised to permit the filler piece to move under it, thus causing that end to be folded back over the filler piece, and the latter continuing its movement until it is carried within tray 101 followed by action of the cutting members 88, 89, after which blades 94 lift and support one cut end of the gauze preliminary to its movement into tray 95 whilst tray 101 and its associated members act to fold over the second severed end of the gauze upon the partially completed pad held by the tray and the completed pad is discharged in the manner above described into the stacking mechanism.

It will be understood that various modifications may be made in the form and arrangement of the elements herein illustrated and described, without departing from the spirit of the invention, what I claim, and desire to secure by Letters Patent, being as follows:

1. In a machine of the character described, means for continuously rotating a roll of filler-strip, means for feeding the strip intermittently from a loop produced by said continuous feeding means, and a cutter reciprocatory to sever successive filler pieces at the end thereof, a pivoted carrier movable horizontally and adapted to turn the filler pieces successively to a position parallel with the line of feed of a gauze wrapping material, means for continuously feeding the gauze wrapping material, means for wrapping the material over upon the filler pieces received thereon in spaced relationship, means for severing the gauze wrapper intermediate two filler pieces, and means for folding the ends of the gauze wrapper over upon the enclosed filler piece, and means for stacking the pads thus completed.

2. In a machine of the character described, in combination with means for feeding a filler-strip by intermittent movement, means for cutting successive filler pieces from the end of the strip, means for continuously moving a gauze wrapping material, means for folding the margins of the wrapping material over upon successive filler pieces deposited on the wrapping material, and means for severing the gauze wrapper intermediate two filler pieces, of means for depositing successive filler pieces upon the gauze wrapper comprising a rotatable carrier adapted to receive successive filler pieces from said severing means by the action of gravity, the carrier receiving the filler pieces directed transversely of the line of movement of the gauze wrapper, means for rotating the carrier on a vertical axis, thereby turning each filler piece to bring its longitudinal axis in line with the axis of movement of the gauze and in register with the latter, and a pusher device associated with the rotatable carrier for engaging successive filler pieces and moving them in a direction toward the gauze when the longitudinal axis of a filler piece has been brought in line with the axis of movement of the gauze wrapper material.

3. In a machine of the character described, in combination with means for feeding a filler-strip by intermittent movement, means for cutting successive filler pieces from the end of the strip, means for continuously moving a gauze wrapping material, means for folding the margins of the wrapping material over upon successive filler pieces deposited on the wrapping material, and means for severing the gauze wrapper intermediate two filler pieces, of means for depositing successive filler pieces upon the gauze wrapper comprising a rotatable carrier adapted to receive successive filler pieces from said severing means by the action of gravity, the carrier receiving the filler pieces directed transversely of the line of movement of the gauze wrapper, means for rotating the carrier on a vertical axis, thereby turning each filler piece to bring its longitudinal axis in line with the axis of movement of the gauze and in register with the latter, and the filler piece feeding means and gauze feeding means being laterally offset one from the other, and the rotatable filler piece carrier comprising a disk-like plate having spaced contact fingers, the area between two fingers being adapted to receive a filler piece, each finger being adapted to act as a pusher member for pushing a filler piece onto the gauze when said piece has been turned with its longitudinal axis in line with the axis of the gauze.

4. In a machine of the character described, in combination with means for feeding a filler-strip by intermittent movement, means for cutting successive filler pieces from the end of the strip, means for continuously moving a gauze wrapping material, means for folding the margins of the wrapping material over upon successive filler pieces deposited on the wrapping material, and means for severing the gauze wrapper intermediate two filler pieces, of means for depositing successive filler pieces upon the gauze wrapper comprising a rotatable carrier adapted to receive successive filler pieces from said severing means by the action of gravity, the carrier receiving the filler pieces directed transversely of the line of movement of the gauze wrapper, means for rotating the carrier on a vertical axis, thereby turning each filler piece to bring its longitudinal axis in line with the axis of movement of the gauze and in register with the latter, the filler piece feeding means and gauze feeding means being laterally offset one from the other and the rotatable filler piece carrier comprising a disk having a plurality of peripherally disposed pusherfingers, the area between two fingers being adapted to receive a filler piece, in combination with a guiding strip angularly of the surface of said disk and being adapted to direct a filler piece in register with the longitudinal axial line of the gauze.

5. In a machine of the character described, in combination with means for intermittently advancing a filler-strip, means for successively severing filler pieces from the end of the strip, means for supporting a strip of gauze wrapping material and for folding the margins of the same over upon successive filler pieces placed upon the gauze, of gauze feeding means comprising a feed roller, the surface of the roller being partially cut away for an area approximately the length of a filler piece and approximately the depth thereof, means for rotating said roller in contact with the gauze, the filler pieces being so spaced on the gauze as to reach the feed roller in registration with its cut away area in order to avoid material compression of the filler piece.

6. A machine constructed in accordance with claim 5 in which the gauze feeding means comprises a plurality of partially cut away rollers, the peripheral length of each cut away area being substantially equivalent to the length of a filler piece and the remaining area of the feed roller being substantially equivalent to the spacing between filler pieces deposited on the gauze wrapper.

7. In a machine of the character described, in combination with means for intermittently feeding a filler-strip, means for cutting successive filler pieces from the ends of the strip, means for supporting a strip of gauze wrapping material, means for folding over the margins of the wrapping material upon filler pieces placed in spaced relation upon the gauze wrapper, of means for feeding the gauze comprising a supporting belt underlying the gauze and the filler pieces thereon, and a plurality of spaced feed rollers in register with the belt, each feed roller being cut away for a part of its periphery approximately equivalent in length to the length of a filler piece and of a depth approximately the thickness of a filler piece, the feed rollers being so arranged that in their rotation the position of one with its cut away area in contact with the gauze and an underlying filler piece will be the reverse of an adjacent feed roller, the cut away area of the latter being out of register with the gauze and its area of greatest distance from the axis of rotation bearing upon the gauze.

8. In a machine of the character described, in combination with means for intermittently advancing a filler strip, means for cutting successive filler pieces from an end of the strip, means for feeding a strip of wrapping gauze and means for wrapping the margins of the gauze over upon spaced filler pieces deposited thereon, of means for severing the gauze intermediate two filler pieces comprising a bodily rotatable cutter blade and a feeding roll carrying the blade, and means for rotating the said feeding roll for imparting a feeding movement to a wrapped filler piece thereon and thereby simultaneously moving the cutter blade toward cutting position relative to the gauze.

9. In a machine of the character described, in combination with means for intermittently advancing a filler-strip, means for cutting successive filler pieces from an end of the strip, means for feeding a strip of wrapping gauze and means for wrapping the margins of the gauze over upon spaced filler pieces deposited thereon, of means for severing the gauze intermediate two filler pieces comprising a bodily rotatable cutter blade and a feeding roll carrying the blade, means for rotating said feeding roll to bring the cutter blade into cutting position and for severing the gauze intermediate two filler pieces enclosed thereby, the said feeding roll being adapted to receive the severed end of the gauze leading to the gauze feeding means and, in the continued rotation of said roll to move said end past cutting position, the movement being continuous until a successive wrapped filler piece is received by the carrier and is moved past cutting position.

10. A machine constructed in accordance with claim 9, in combination with finger-like blades mounted on the feeding roll for receiving a severed end of the gauze and for transporting the same past cutting position.

11. A machine constructed in accordance with claim 9, in combination with finger-like blades mounted on the carrier for receiving a severed end of the gauze and for transporting the same past cutting position, a tray having its bottom wall apertured to receive said finger-like blades of the carrier and adapted to receive said end of the gauze, and means for moving the tray toward and from the periphery of the carrier.

12. In a machine of the character described, in combination with means for intermittently advancing a filler-strip, means for cutting successive filler pieces from an end of the strip, means for feeding a strip of wrapping gauze and means for wrapping the margins of the gauze over upon spaced filler pieces deposited thereon, a cutter for severing the gauze intermediate two filler pieces, a tray adapted to receive a severed end of the gauze leading to the gauze feeding means, a carrier for receiving and moving a filler piece wrapped by the gauze having its end disposed within the tray, means for moving the tray in a direction away from the carrier whereby the latter in continued movement carries said filler piece under the tray, the carrier and tray co-acting in folding said end of the gauze over upon said filler piece, a second tray adapted to receive the filler piece with one end of the gauze folded over upon it as recited, and means for moving the said second tray to and from a discharge position.

13. In a machine of the character described, in combination with means for intermittently advancing a filler-strip, means for cutting successive filler pieces from an end of the strip, means for feeding a strip of wrapping gauze and means for wrapping the margins of the gauze over upon spaced filler pieces deposited thereon, a cutter for severing the gauze intermediate two filler pieces, a tray adapted to receive a severed end of the gauze leading to the gauze feeding means, a carrier for receiving and moving a filler piece wrapped by the gauze having its end disposed within the tray, means for moving the tray in a direction away from the carrier whereby the latter in continued movement carriers said filler piece under the tray, the carrier and tray co-acting in folding said end of the gauze over upon said filler piece, a second tray adapted to receive the filler piece with one end of the gauze folded over upon it as recited, means for moving the said second tray to and from a discharge position, and spaced rollers at opposite sides of the discharge position of said last-named tray.

14. A machine constructed in accordance with claim 13, in combination with means for rotating said rollers and blade device movable toward and from the discharge position of the recited second tray.

15. In a machine of the character described, in combination with means for intermittently advancing a filler-strip, means for cutting successive filler pieces from an end of the strip, means for feeding a strip of wrapping gauze and means for wrapping the margins of the gauze over upon spaced filler pieces deposited thereon, a cutter for severing the gauze intermediate two filler pieces, a tray adapted to receive a severed end of the gauze leading to the gauze feeding means, a carrier for receiving and moving a filler piece wrapped by the gauze having its end disposed within the tray, means for moving the tray in a direction away from the carrier whereby the latter in continued movement carries said filler piece under the tray, the carrier and tray co-acting in folding said end of the gauze over upon said filler piece, a second tray adapted to receive the filler piece with one end of the gauze folded over upon it as recited, means for moving the said second tray to and from a discharge position, spaced rollers at opposite sides of the discharge position of said last-named tray, and a stacking device adapted to receive the wrapped pad from said discharge position and comprising an open-top receptacle disposed below said second tray, a pusher plate at the receiving end of said receptacle, and means for reciprocating said pusher plate.

OLIVER E. TEALL.